(No Model.)

T. J. O'BRIEN.
STREET RECEIVER AND STENCH TRAP.

No. 343,335. Patented June 8, 1886.

Witnesses.
Jennie M. Caldwell
Mrs. J. G. Johnson

Inventor.
Thos. J. O'Brien
By James Sangster
atty.

N. PETERS, Photo-Lithographer, Washington, D. C.

UNITED STATES PATENT OFFICE.

THOMAS J. O'BRIEN, OF BUFFALO, NEW YORK.

STREET-RECEIVER AND STENCH-TRAP.

SPECIFICATION forming part of Letters Patent No. 343,335, dated June 8, 1886.

Application filed March 29, 1886. Serial No. 196,883. (No model.)

*To all whom it may concern:*

Be it known that I, THOMAS J. O'BRIEN, a citizen of the United States, residing in Buffalo, in the county of Erie and State of New York, have invented certain new and useful Improvements in Street-Receivers and Stench-Traps, of which the following is a specification.

My invention relates to certain improvements in street-receivers and stench-traps, whereby the receiver is comparatively light, strong, durable, and easy of access. Its construction is simple, and being made of several pieces it is more easily molded and put together, and its shape adapts it to retain its position in the ground or to resist the lifting action of the frost, all of which will be fully and clearly hereinafter shown, described, and, claimed by reference to the accompanying drawings, in which—

Figure 1:
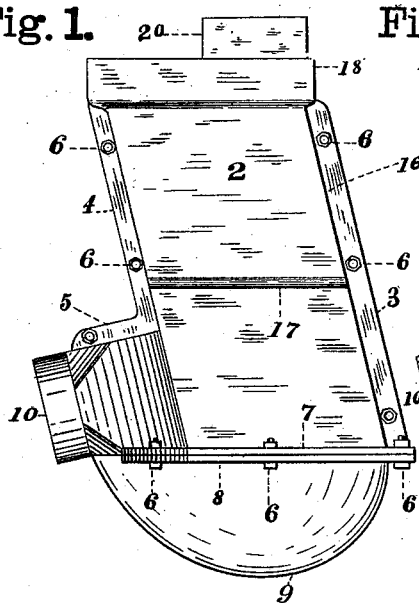
Figure 2:
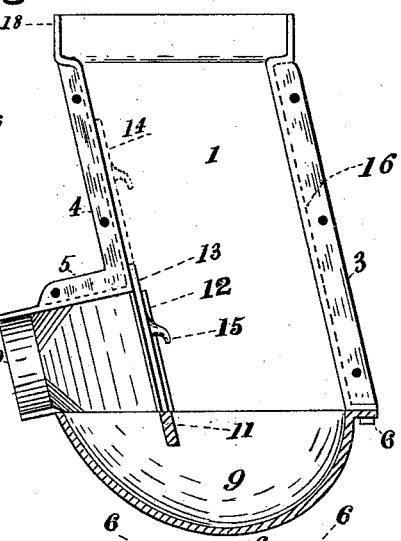
Figure 3:
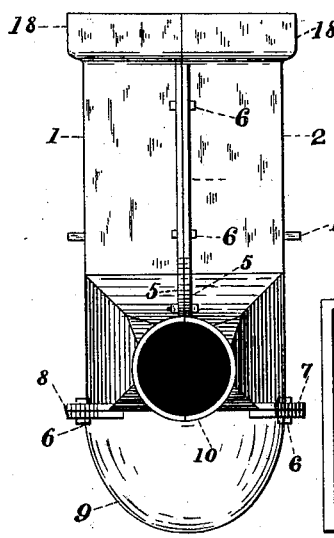
Figure 4:
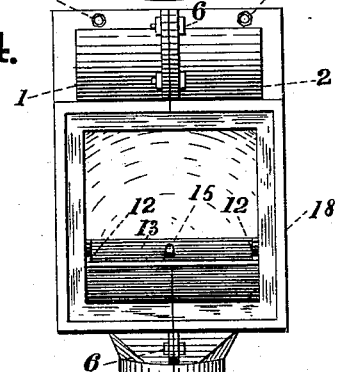
Figure 5:
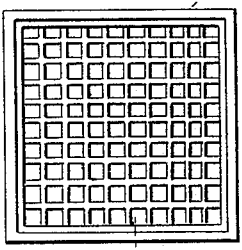
Figure 6:
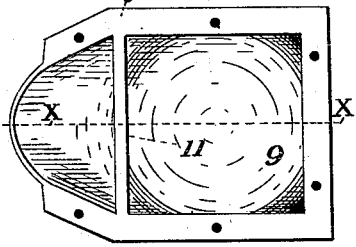

Figure 1 is a side elevation of the receiver complete. Fig. 2 is a similar view showing one side taken off, so as to expose the interior construction, and showing also a vertical central section down through the bottom in line X X, Fig. 6. Fig. 3 is a front elevation. Fig. 4 is a top view, the grate being left off, so as to show a similar view of the interior of the same. Fig. 5 is a plan of the top of the receiver-head, showing the usual grate in place; and Fig. 6 represents a detached top view of the bottom piece of the receiver.

The body of the receiver is composed of the two sides 1 and 2, each of which is provided with flanges 3, 4, and 5, adapted to fit together, so as to be secured by the bolts 6. At the lower ends of the side pieces, 1 and 2, is a flange 7, adapted to fit the flange 8 of the hollow bottom piece, 9, to which it is secured by bolts 6.

10 represents the outlet-opening, adapted to receive the pipe or tile leading to the sewer.

The hollow bottom piece, 9, is made in nearly a semi-spherical form, the inside being concaved, as shown, (see Fig. 2,) and is provided with a cross-piece, 11, which projects down into the concave portion of the bottom, and forms a trap to catch the dirt, stones, brick, or other matter that gets in, and which settles down to the bottom. This part 9 is so formed that it may be easily molded and cast, the cross-piece 11 being cast in one piece with the rest of it without the use of separate cores. The side pieces, 1 and 2, are also formed so as to be easily molded without the use of core-boxes, so that the castings are as cheaply made as any ordinary castings, and the two sides and the bottom are bolted together by bolts 6, as shown. Each of the side pieces are provided with a nearly vertical slideway or groove, 12, adapting them (when bolted together, as above mentioned) to receive the plate or shut-off door 13. This shut-off or door slides up, as shown by the dotted lines 14 in Fig. 2, and may be drawn up and taken out when required. It is provided with a hooked portion, 15, so as to be easily reached and grasped by a hooked bar to draw it up. Of course, any other kind of a handle may be used in place of the hook 15. This shut-off 13, when down in place, fits and rests closely against the cross-piece 11, and the mud and dirt going in with the water soon fill up whatever little opening there may be, and thereby form a perfect stench-trap, having a door which may at any time required be taken out, so as to leave the receiver easily accessible for cleaning or for repairs, and if any dirt or other obstructions should get into the pipe or tile leading to the sewer it can be easily got at and removed, after which the sliding door may be readily put in place again.

It will be noticed that the receiver is set in an inclined position. This construction provides the means for securely holding it down in place, and prevents the frost from lifting it up out of position. The inclined back portion, 16, receives a portion of the weight of the earth, which tends to hold it down, besides the flanges and the projecting front portion and also the side flanges, 17, assist in keeping it in place.

The top of the receiver is provided with a flange portion, 18, into which is placed the usual grate-plate, 19, (see Fig. 5,) and when required the box-grate 20 may be put in, and, the receiver's opening being square, this grate may be put in at either desired side of the square. All these parts are easily removable when it becomes necessary to clean or repair the receiver, or for other purposes.

The form of the receiver is such as to insure the required strength, and at the same time less material is required in its construction.

I claim as my invention—

1. A street-receiver and stench-strap consisting of the parts 1 and 2, each having a slideway, 12, a pipe or tile receiving portion, 10, and flanges, adapting them to be bolted together, in combination with the sliding plate or door 13 and the bottom 9, having the cross-piece 11, and flanges, adapting it to be bolted to the two side pieces, 1 and 2, substantially as specified.

2. A street-receiver and stench-trap consisting of the inclined portions 1 and 2, bolted together and provided with interior slideways adapted to receive a sliding plate and having the tile-receiving portion 10, in combination with a concave bottom provided with a cross-piece, 11, upon which the sliding door sets when in place, for the purposes specified.

3. A street-receiver and stench-trap consisting of two parts provided with slideways and a sliding plate or door, a flanged top portion adapted to receive the grate, and flanges by which the two parts are bolted together, in combination with a concave bottom having a cross-piece, 11, and a flange by which it is bolted to the parts 1 and 2, substantially as specified.

THOS. J. O'BRIEN.

Witnesses:
JAMES SANGSTER,
JENNIE M. CALDWELL.